C. PIRTLE.
RESILIENT WHEEL.
APPLICATION FILED DEC. 6, 1912.
1,130,762.
Patented Mar. 9, 1915.
5 SHEETS—SHEET 1.
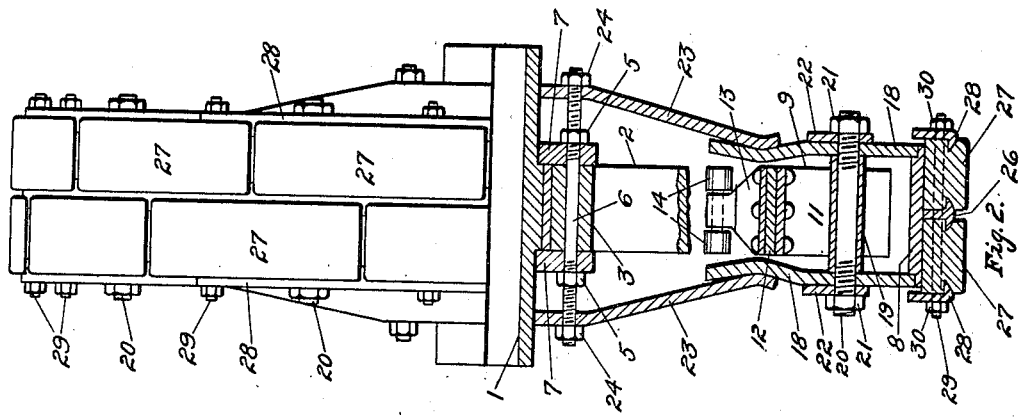
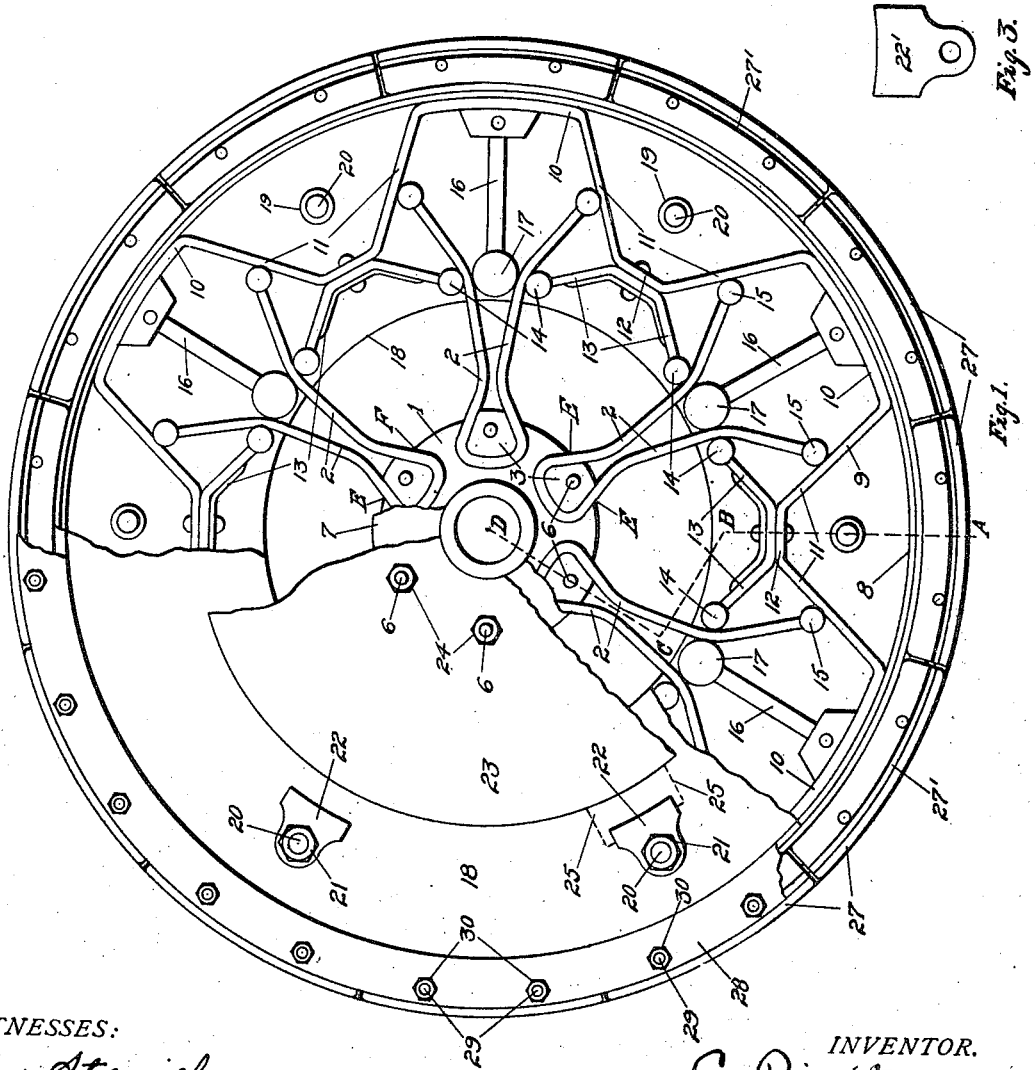
WITNESSES:
INVENTOR.
C. Pirtle
BY
F. N. Barber
ATTORNEY.

C. PIRTLE.
RESILIENT WHEEL.
APPLICATION FILED DEC. 6, 1912.
1,130,762.
Patented Mar. 9, 1915.
5 SHEETS—SHEET 2.
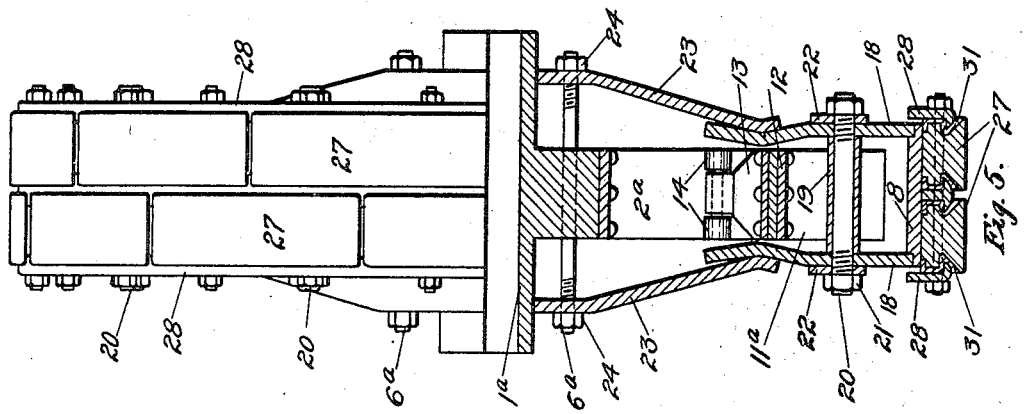
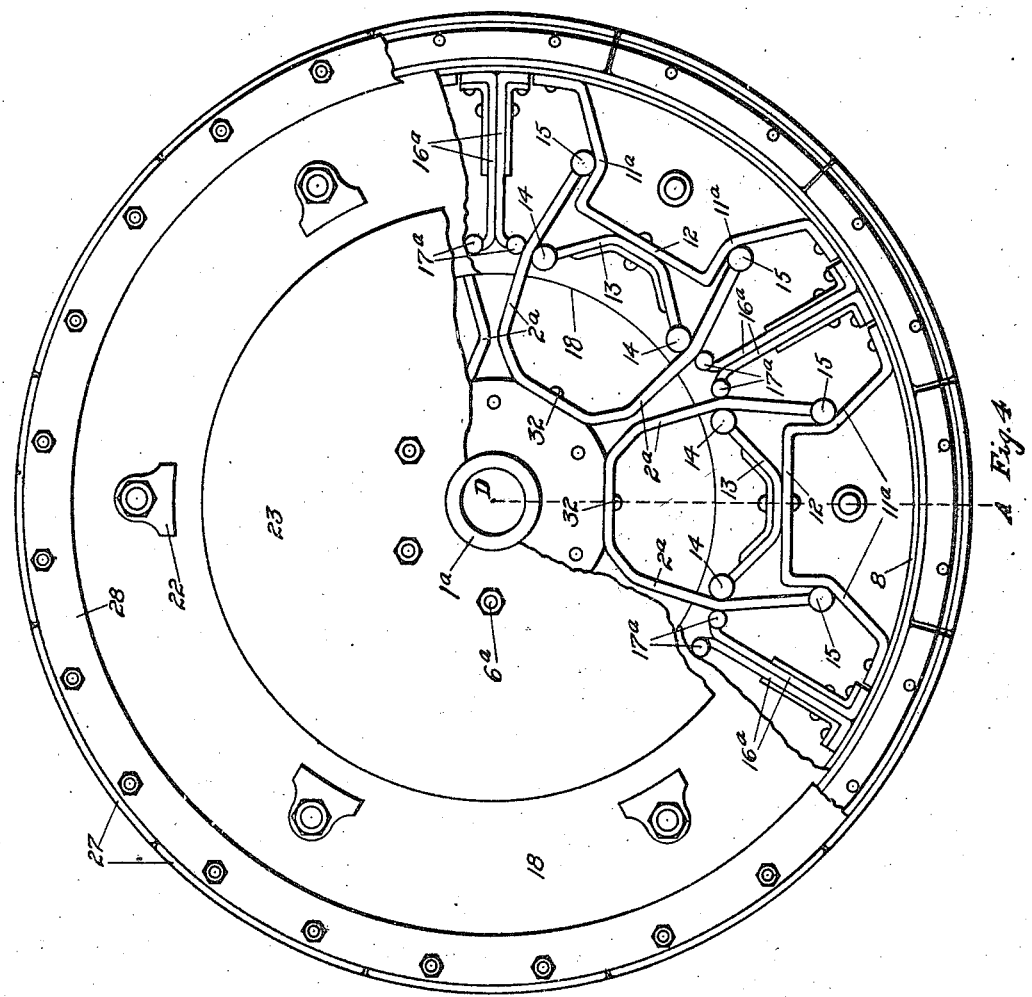
WITNESSES:
INVENTOR.
C. Pirtle
BY
F. N. Barber
ATTORNEY.

C. PIRTLE.
RESILIENT WHEEL.
APPLICATION FILED DEC. 6, 1912.
1,130,762.
Patented Mar. 9, 1915.
5 SHEETS—SHEET 3.
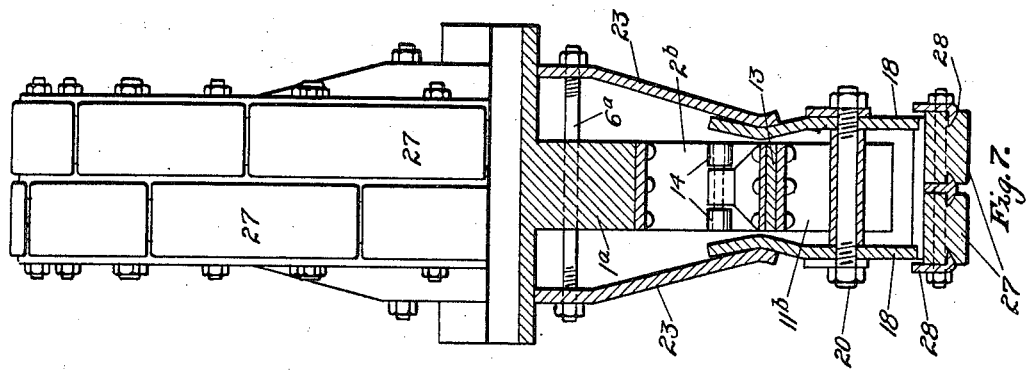
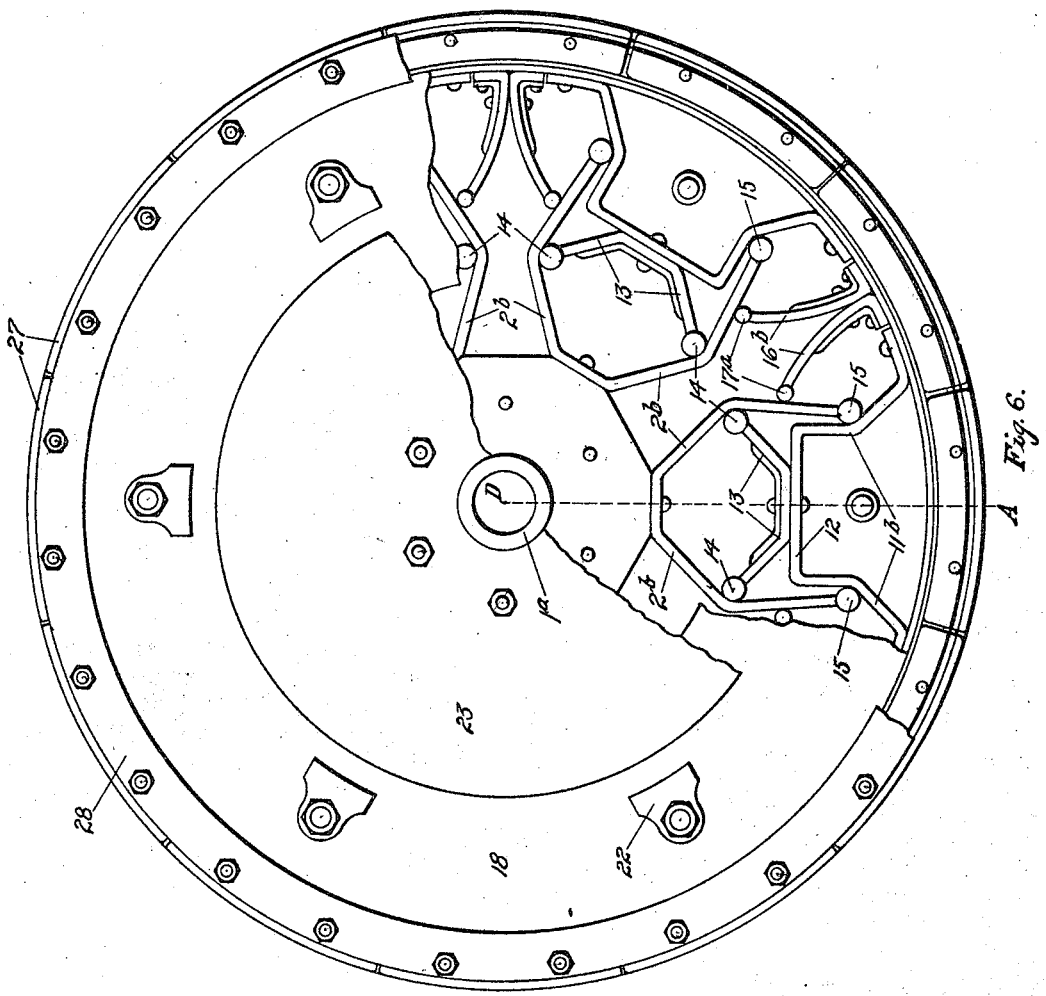
WITNESSES:
Elva Staniek
R. F. Dilworth
INVENTOR.
C. Pirtle
BY
F. N. Barber
ATTORNEY.

C. PIRTLE.
RESILIENT WHEEL.
APPLICATION FILED DEC. 6, 1912.
1,130,762.
Patented Mar. 9, 1915.
5 SHEETS—SHEET 4.
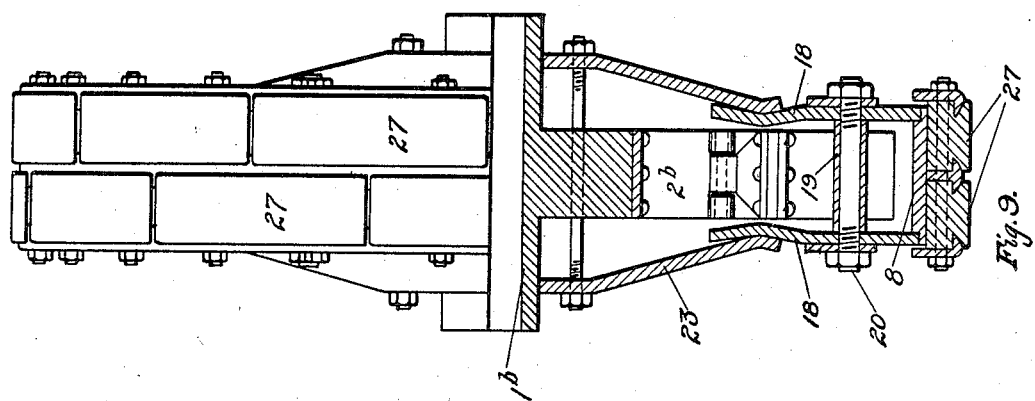
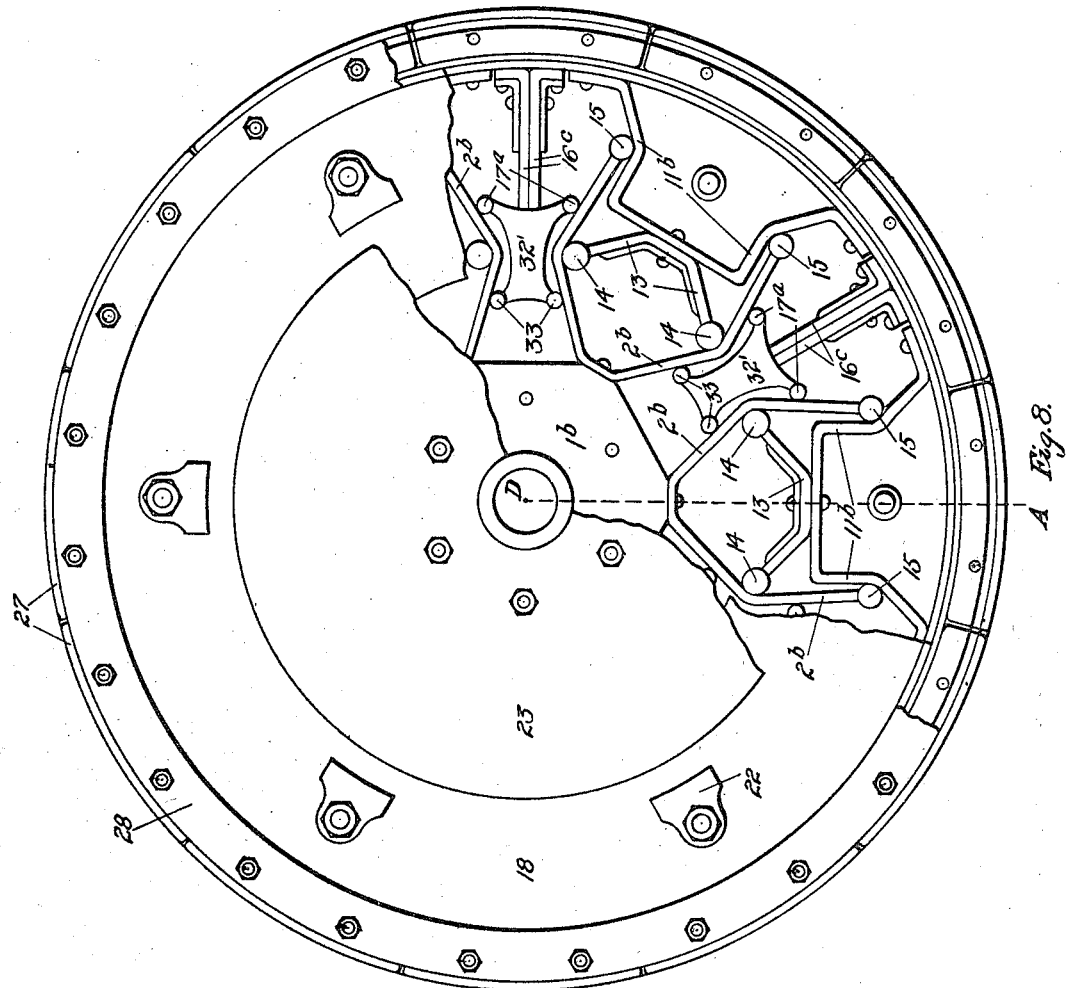
WITNESSES:
INVENTOR.
C. Pirtle
BY
ATTORNEY.

C. PIRTLE.
RESILIENT WHEEL.
APPLICATION FILED DEC. 6, 1912.
1,130,762.
Patented Mar. 9, 1915.
5 SHEETS—SHEET 5.
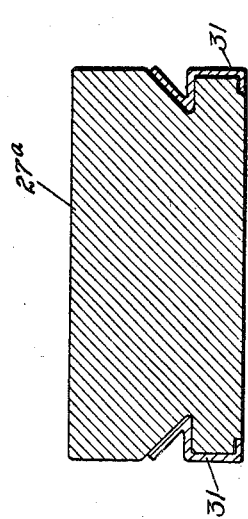
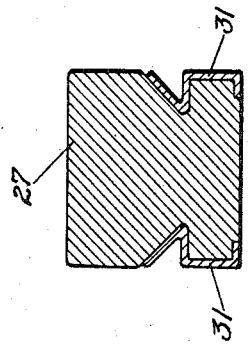
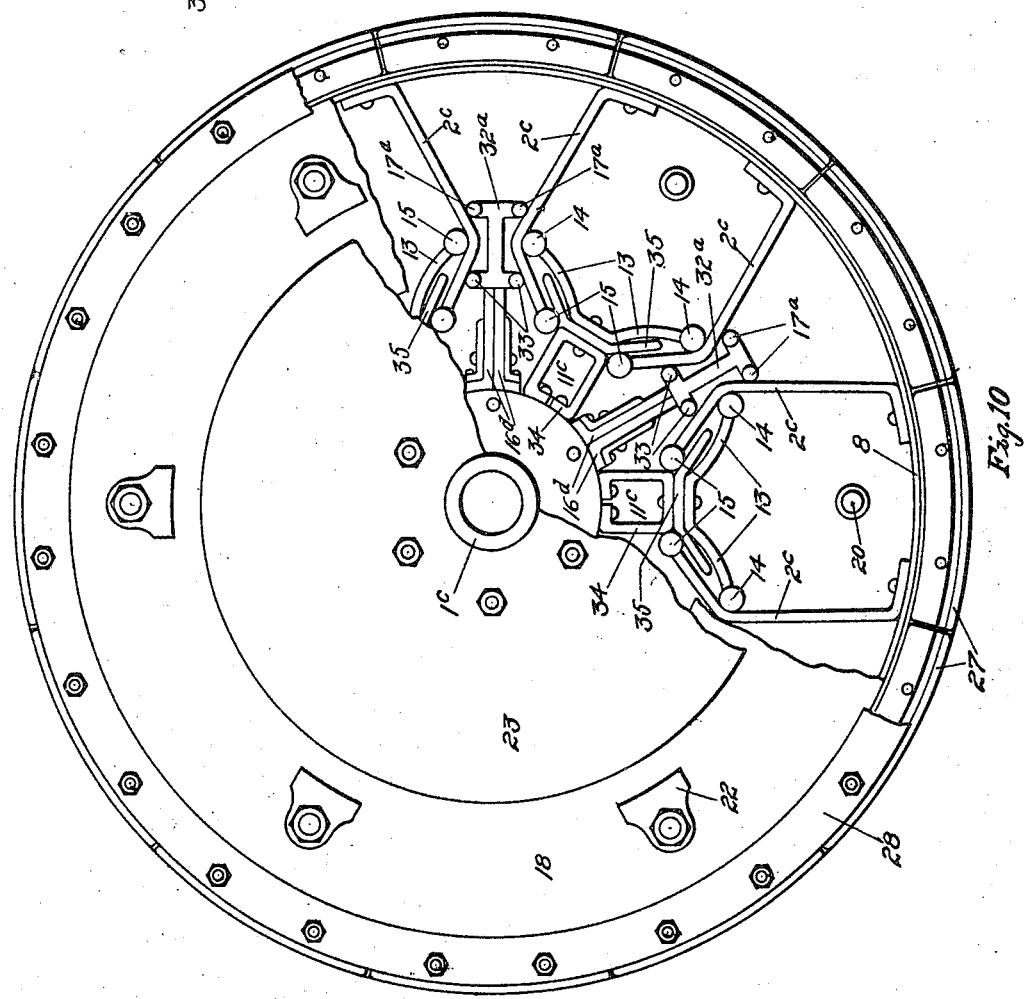

UNITED STATES PATENT OFFICE.

CLAIBORNE PIRTLE, OF CLEVELAND, OHIO.

RESILIENT WHEEL.

1,130,762.    Specification of Letters Patent.    Patented Mar. 9, 1915.

Application filed December 6, 1912. Serial No. 735,219.

*To all whom it may concern:*

Be it known that I, CLAIBORNE PIRTLE, a citizen of the United States, residing at Cleveland, in the county of Cuyahoga and State of Ohio, have invented new and useful Improvements in Resilient Wheels, of which the following is a specification.

My invention relates particularly to vehicle wheels designed to protect the axle and the parts carried thereby from shock and vibration, but it may be applied to other uses where resilient wheels are desirable.

The objects of this invention are to provide a resilient wheel that protects the axle about which it rotates from shock and vibration, that gives a rapidly increasing opposition to compression or loading, that utilizes friction to assist in protecting the axle from sudden shocks or hammer blows, that limits the maximum movement of the rim relative to the hub, so as to insure that the resilient members are not worked beyond their elastic limit, that prevents violent reaction or rebound after sudden compression, that may on occasion be converted into a solid or rigid wheel, that may have the tire, tread, or outer circumference portion easily applied or renewed, and that supplies all the working parts automatically with abundant lubrication.

In the accompanying drawings which illustrate my invention Figure 1 is a side elevation of the wheel with portions cut away so as to show all the parts; Fig. 2, a section on the line A. B. C. D. in Fig. 1, and an elevation of the upper half of the wheel, and Fig. 3, one of the large cleats for converting the wheel into a solid or rigid wheel. Figs. 4, 6, 8, and 10 are side elevations of four modifications of my invention, parts being broken away to show the internal construction. Figs. 5, 7, and 9 are edge views of the wheels shown in Figs. 4, 6, and 8, the lower half of each wheel being shown in vertical central section. Fig. 11 is a section showing my preferred means for reinforcing the tread of the wheels. Fig. 12 is a section of a tread block having the full width of the rim and reinforced with metallic facing.

Referring first to Figs. 1, 2, and 3, 1 represents the hub to which the springs 2 are rigidly secured. The springs 2 are not to be considered as necessarily double-armed, but each arm is to be considered as a spring, from the point E outwardly. I have shown the springs 2 connected at their inner ends in pairs, each pair being connected by a loop set in a recess in the flange of the hub 1, a filler 3 occupying that portion of the recess which is included in the loop. Annular plates 7 rest against opposite ends of the hub flange and of the fillers 3 and are tightly clamped in place by the nuts 5 on the bolts 6 which pass through the plates 7 and the fillers 3. The pairs of springs 2 extend outwardly from the hub 1 at regular distances around the edge thereof.

8 represents a continuous circular outer rim to the inner face of which the inner rim 9 is secured. The rim 9 is not necessarily continuous. It has at regular distances the portions 10 resting against the inner face of the rim 8, and between consecutive portions 10 the portions 11 serving as compression guides or cam paths for the springs 2. The guides 11 between consecutive portions 10 are inclined inwardly and toward each other from the opposing ends of the portions 10, the inner ends of the guides 11 being joined together by the seat 12 to which are secured the springs 13, one extending at each side of a radius passing through the seat 12. The springs 13 are shown as parts of a continuous structure, but I consider each arm thereof lying opposite the cam path 11 adjacent thereto as a spring 13.

The pairs of springs 2 projecting from the same recess in the hub, diverge somewhat at or near the hub to a point where they contact with the rollers 14 on the outer ends of the springs 13, each of which extends inwardly toward the hub and laterally away from a radius extending through its point of attachment to the seat 12. From the points where the pairs of springs 2 contact with a roller 14, they diverge so that their free ends, or the roller 15 thereon, engage with the cam paths 11.

The arms 16 have their outer ends pivoted to blocks on the inner face of the rim portions 10. The inner ends of the arms 16 are provided each with a roller 17 which stands between the members of a pair of springs 2.

The wheel is shown with the parts in the positions which they assume when there is no load bearing down on the hub 1. If the lower part of the rim be displaced by a load, or other means toward the hub or the latter be displaced toward the lower part of the rim by the rim striking a stone, for example, the outer ends of the springs 2 in the lower portion of the wheel are guided along the cam paths 11 in a direction tending to straighten them, or toward the arm 16 with which it coöperates. At the same time any roller 17 at the bottom of the wheel will force apart the springs 2, between which it is situated. The rollers 14 at the sides of the pair of springs 2 receive horizontal thrusts and transmit them to contiguous springs 13, the roller 17 acting to transmit thrusts from the spring 2 on one side thereof to the spring 2 on the other side. The result will be a rapidly increasing opposition to the movements of the said rollers and springs. In the upper portion of the wheel the springs 2 and 13 interact to bring each other into compression or tension independently of the guides 11. At points approximately ninety degrees from the top and bottom of the wheel, the springs 2 will be deflected down nearly at right angles to their direction from the points E to the rollers 14 and 17. The springs 13 will be flexed at the same time. The various springs will have movement in various directions in response to thrusts on the hub or rim and in the plane of the wheel. Some of the springs, as those in line with the direction of thrust, will travel more or less endwise, but their movements will be checked by their resistance to change in shape consequent upon their co-action with the cam paths 11, the springs 13 and the roller 17. Other springs will move more or less at right angles to the lengths, but their movements will be checked by their resistance to change in shape and by the action of co-acting springs. Still other springs will take a more or less compound movement, that is, they will move somewhat lengthwise and somewhat crosswise, this compound movement being checked by the increasing resistance due to the work required to change the shape of the springs.

Annular outer cover-plates 18, one at each side of the wheel extend from the rim 8 toward the hub. They form tight joints with the rim and are spaced apart by interposed sleeves 19, through which and the plates 18 the bolts 20 extend. The nuts 21 on the ends of these bolts draw the plates 18 tightly against the edges of the rim and the ends of the sleeves 19, a stop plate or cleat 22 being also on each end of each bolt 20 between each nut and the adjacent plate 18.

The central cover-plates 23 are slid over the ends of the hub and have their outer portions overlapping the outer edges of the outer cover-plates 18. The outer edges of the plates 23 lie within the circle formed by the inner ends of the stop plates 22, which limit the movement of the rim and hub, one toward the other. This movement is limited by the size of the plates 23 and the location of the plates 22 so that the springs will not be strained beyond their elastic limit. The cover-plates 23 are slid over the ends of the bolts 6 and drawn toward each other and tightly against the cover-plates 18 by means of the nuts 24. The friction between the cover-plates 18 and 23 assists in protecting the axle from sudden shocks or hammer blows, the friction increasing as the plates slide on each other, because the cover-plates 23 which normally have their edges dipping into the annular inwardly bent depressions or cam grooves in the plate 18, are required to ride more or less on the outwardly inclined walls of this depression whenever the rim and hub are displaced relatively to each other. The friction between the cam-plates may be adjusted by means of the nuts 24.

The rim and cover-plates form an oil or grease tight chamber, in which oil and grease may be placed to provide ample lubrication. The lubricant assists to transfer any heat developed by the action of the springs to the cover plates for radiation.

By substituting for the stop-plates 22 longer stop-plates which reach from the bolts 20 to the edge of the plates 23, the wheel could be converted into a rigid wheel, which might be temporarily desirable in case any of the working parts became broken or damaged. Fig. 3 shows one of the longer stop-plates marked 22'. The dotted lines 25 on Fig. 1 show the position of such a plate in use.

The rim 8 is surrounded by the tread-retaining ring 26 arranged midway between the edges of the rim and preferably provided with annular lateral flanges or fins which bite into the edges of a series of tread-blocks 27 on each side thereof, or the flanges or fins may enter grooves 27' previously made in the blocks. The rings 28 are arranged at the outer edges of the tread-blocks 27 and have flanges or fins which engage in grooves in the outer sides of the blocks. Bolts 29 extend through the central ring 26, the two lateral rings 28, and the blocks 27. Nuts 30 on the bolts 29 bear against the rings 28 and bind the rings and tread-blocks solidly together. The ring 26 need not be connected to the rim 8, because the edges of the rings 28 lie against the edges of the rim, as shown in Fig. 2. In Fig. 11, I have shown an enlarged section of a tread-block 27 provided at each side with a metallic facing 31, which enters the grooves in the block. The facings 31 prevent the blocks from splitting and make them stronger and less liable to become loose.

Referring now to Figs. 4 and 5, the parts thereof which are the same as on Figs. 1 and 2 have been given the same reference characters, and parts thereof which have structure or function similar to parts on Figs. 1 and 2 have been given the same reference characters, to which letters have been added. The springs 2ᵃ have the same general shape as the springs 2. The members of adjacent pairs of springs are connected together and secured to the hub by the headed fasteners 32. The cam paths 11ᵃ incline the same as the cam paths 11 from the rim 8 to the rollers 15, at which they take the direction of a chord drawn between the hub and the contacting rolls 15, thereby requiring the spring to be put under greater strain, whenever the cam path 11ᵃ and the rollers 15 have relative travel in either direction. In Fig. 1 the springs 2 and the cam paths do not coöperate so as to increase the resistance to movement of any portion of the rim away from the hub, or of the hub away from any portion of the rim. In Fig. 4, the change of direction of each cam path 11ᵃ from the roller 15 toward the hub causes resistance to the movements last described. The two parts of the cam path include chords which pass on opposite sides of the center of the wheel. The arms 16ᵃ carrying the rollers 17ᵃ are made of spring material and are rigidly secured to the rim 8. The arms 16ᵃ offer yielding resistance to any movement tending to bend them, as would be the case with the arm 16.

In Figs. 6 and 7, the parts are in general as on Figs. 4 and 5. The springs 2ᵇ are bent at a sharper angle where they contact with the rollers 14; the angle in the cam paths 11ᵇ is placed relatively nearer the rim, or about centrally; and the arms 16ᵇ are made divergent and have their rollers 17ᵃ in engagement with the springs 2ᵇ between the rollers 14 and 15. The spring arms 16ᵇ, not being between the rollers 14, are placed under compression or strain with any relative movement of the rim and hub, and particularly with any movement of the rollers 14 and 15, relative to the springs 2ᵇ and the cam paths 11ᵇ.

In Figs 8 and 9, the parts are nearly as in Figs. 6 and 7. The arms 16ᶜ are made of spring material as in Fig. 4. They support at their outer ends the carrier 32' which is between the bends of the pairs of springs 2ᵇ. This carrier supports the two rollers 17ᵃ which bear against the springs 2ᵇ between the rollers 14 and 15, as in Fig. 6, and the two rollers 33 which bear against the springs 2ᵇ between the hub 1ᵇ and the rollers 14. The rollers 17ᵃ and 33 place the springs 2ᵇ under tension at opposite relative movements of the hub and rim, as is readily apparent.

Referring now to Fig. 10, the springs and their guides and their coöperating elements are reversed with respect to the rim and hub from the location of the same or analogous parts on the preceding figures. The springs 2ᶜ are attached to the rim 8, and the arms 16ᵈ are attached to the hub. The cam paths 11ᵉ consist of two parts, one, marked 34, being a strip of metal bent to rectangular form and attached to the hub, the sides being parallel and chords lying at opposite sides of the center of the hub; the other, marked 35, being a strip of metal attached to the outer end of the part 34 and having its ends bent toward the rim where the sides of the part 34 meet the part 35. The rollers 15 lie normally in the angles between the parts 34 and 35 of the cam path 11ᶜ, just as the rollers 15 of the springs 2ᵇ lie in the angles in the cam paths 11ᵃ and 11ᵇ.

I claim—

1. In a vehicle wheel, a hub member, a rim member, cam paths attached to one member and having inclinations at an angle to the radius, springs attached to the other member and having cam paths thereon, the ends of the springs riding lengthwise of the first cam paths, and springs connected to one of the members and coöperating with the cam paths on the first springs.

2. In a vehicle wheel, a hub member, a rim member, double cam paths attached to one member and having inclinations at an angle to the radius, springs attached to the other member and having double cam paths meeting at an angle less than 180°, the springs riding lengthwise of the first cam paths, and springs connected to one of the members and coöperating with the cams on the first springs.

3. In a vehicle wheel, a hub member, a rim member, double cam paths attached to one member, springs attached to the other member and having double cam paths meeting at an angle less than 180°, the springs riding lengthwise of the first cam paths, and other springs connected to one of the members and coöperating with both cam paths within the angle formed by their meeting.

4. In a vehicle wheel, a hub member, a rim member, cam paths attached to one member, each cam path having a bend from which its parts lie in chords drawn at opposite sides of the center of the wheel, springs attached to the other member and having their ends normally in the bends of the cam paths and provided with cam paths, each having a transverse bend, and springs attached to one of the members and having their ends normally at the bends of the cam paths in the springs.

5. In a vehicle wheel, a hub member, a rim member, a spring attached to one member, and having a transverse bend therein, a cam path for the end of the spring, attached to the other member, the cam path having a transverse bend in the direction opposite the bend in the spring, in which bend the end of the spring normally rests, and a spring bearing on the first spring at the inside of the bend, whereby both springs are placed under increased tension when the hub or rim moves approximately in radial lines through the said bends.

Signed at Cleveland, Ohio, this 25th day of November, 1912.

CLAIBORNE PIRTLE.

Witnesses:
J. H. HALL,
B. M. DIEMER.